March 25, 1930. V. KARBOWSKI 1,751,741
INTERNAL SPRING METAL REENFORCING MEMBER
Filed Sept. 7, 1926
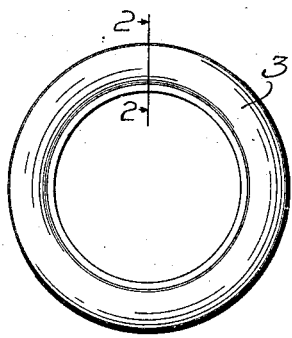
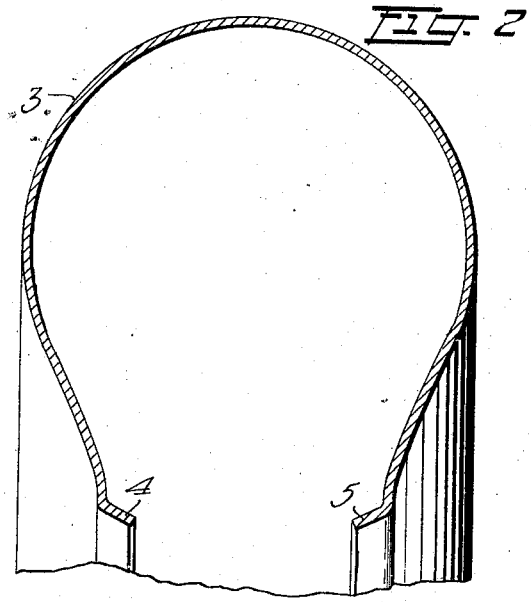
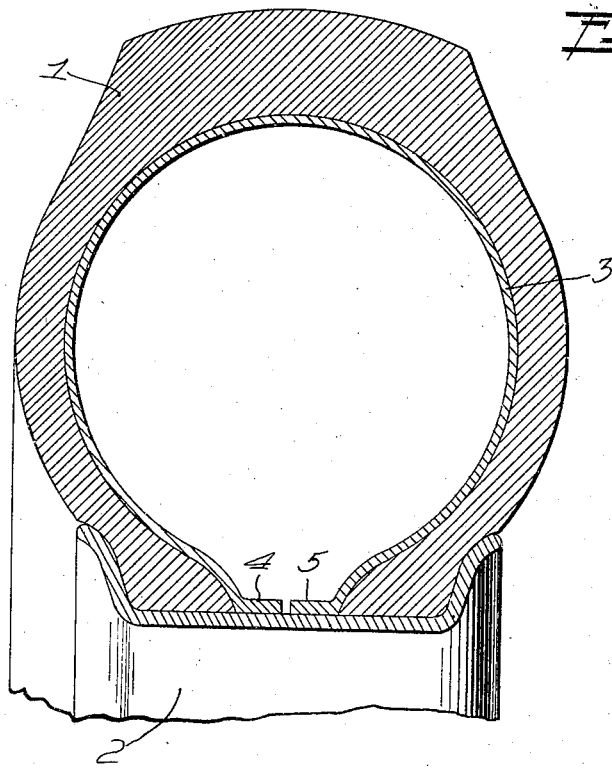
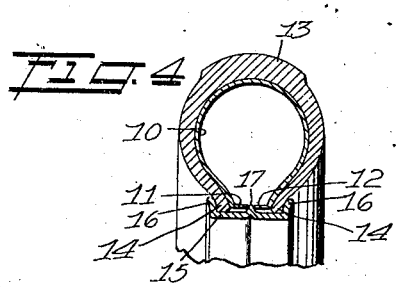
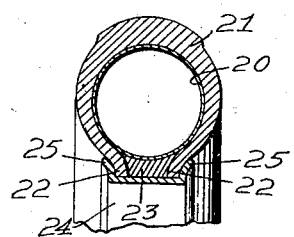
INVENTOR
V. KARBOWSKI
BY
ATTORNEYS Patented Mar. 25, 1930

1,751,741

UNITED STATES PATENT OFFICE

VICTOR KARBOWSKI, OF CHICAGO, ILLINOIS, ASSIGNOR TO FELIX S. FELDHEIM, OF EVANSTON, ILLINOIS

INTERNAL SPRING-METAL REENFORCING MEMBER

Application filed September 7, 1926. Serial No. 134,052.

My invention relates to improvements in internal spring metal reenforcing members, and it consists in the combinations, constructions, and arrangements herein described and claimed.

An object of my invention is to provide an internal spring metal reenforcing member which takes the place of the ordinary inner tube, and which provides substantially the same resiliency as the inner tube.

A further object of my invention is to provide a device of the type described which may be readily inserted within a vehicle tire, and conform to the inner walls thereof.

A further object of my invention is to provide a device of the type described which will force the beads of the tire outwardly against the rim when the tire is applied thereto.

A further object of my invention is to provide a device of the type described which is durable and efficient for the purpose intended, and inexpensive to manufacture.

Other objects and advantages will appear in the following specification, and the novel features of the invention will be particularly pointed out in the appended claim.

My invention is illustrated in the accompanying drawings, forming part of this application, in which Figure 1 is a side elevation of the device, Figure 2 is an enlarged section along the line 2—2 of Figure 1, Figure 3 is a sectional view of the device as applied to a vehicle tire and rim, and Figures 4 and 5 are modified forms of my device.

In carrying out my invention, I make use of a vehicle tire 1 and a vehicle rim 2.

The internal reenforcing member consists of a single piece of spring metal 3 of uniform thickness which is bent into the form of a split annulus or ring of substantially cylindrical cross section. The edges of the split portion are normally inclined toward each other as shown in Figure 2 and are provided with inwardly extending flanges 4 and 5 which, when the reenforcing member is not under tension, take the position shown in Figure 2.

From the foregoing description of the various parts of the device, the operation thereof may be readily understood. In placing the reenforcing member within the vehicle tire, the walls of the tire are moved outwardly and the member is forced therein. In applying the tire and the reenforcing member to the rim 2, the flanges 4 and 5 are forced toward each other into the position shown in Figure 3. When the reenforcing member and the tire are assembled upon the rim, the flanges 4 and 5 bear upon the rim 2, see Figure 3. In this manner, the force applied to the tire is distributed through the reenforcing member to the rim. It is obvious that the flange portions 4 and 5 force outwardly and firmly hold the bead of the tire against the side walls of the rim. In this manner, there is no possibility of the tire coming off the rim.

In Figure 4, I have shown a modified form of my device which consists of an internal reenforcing member 10 constructed of a spring metal cylinder. The reenforcing member 10 is identical in construction to the reenforcing member 3 shown in Figure 2, and is provided with inwardly extending flanges 11 and 12. I make use of a vehicle tire 13 having bead portions 14.

I provide a vehicle rim 15 having outwardly extending flanges 16 and an outwardly extending tightening flange 17. The flange 17 is disposed at the center of the rim 15, the walls of the flange 17 tapering outwardly. The reenforcing member 10 is placed within the tire 13, and the vehicle tire, together with the reenforcing member, is disposed upon the rim 15. The flanges 11 and 12 are disposed upon each side of the flange 17 and contact with the tapering walls thereof. When pressure is applied to the tread of the tire, the force would move the flanges 11 and 12 inwardly toward the rim 15 and outwardly toward the integral flanges 16. In this manner, the beads 14 of the tire are firmly held against the flanges 16 of the rim, therefore preventing any possibility of the tire and reenforcing member coming off the rim.

In Figure 5, I have shown another modified form of my device which consists of an internal reenforcing member 20 constructed of a spring metal tube. I make use of a vehicle tire 21 into which the reenforcing member 20 is inserted. The tire 21 is provided with bead portions 22. I provide a ring 23 which is constructed of relatively hard rubber and disposed between the bead portions 22. I make use of a rim 24 having outwardly extending flanges 25. The vehicle tire 21, the reenforcing member 20, and the ring 23 are disposed upon the rim when assembled. The ring 23 serves as a cushion for the reenforcing member 20 and also forces the bead portions 22 outwardly against the flanges 25 when pressure is applied to the tread of the vehicle tire.

It is obvious that in all these forms of my device, the vehicle tires may be formed about the reenforcing members, if it is so desired.

I claim:

A reenforcing member for tires consisting of a single piece of spring sheet metal of uniform thickness bent to form a split annulus having a substantially cylindrical cross section, the edges being normally inclined toward one another and being provided with flanges, said flanges being adapted to be brought into a transverse alignment by external pressure on the walls of the reenforcing member.

VICTOR KARBOWSKI.